Figure 5:
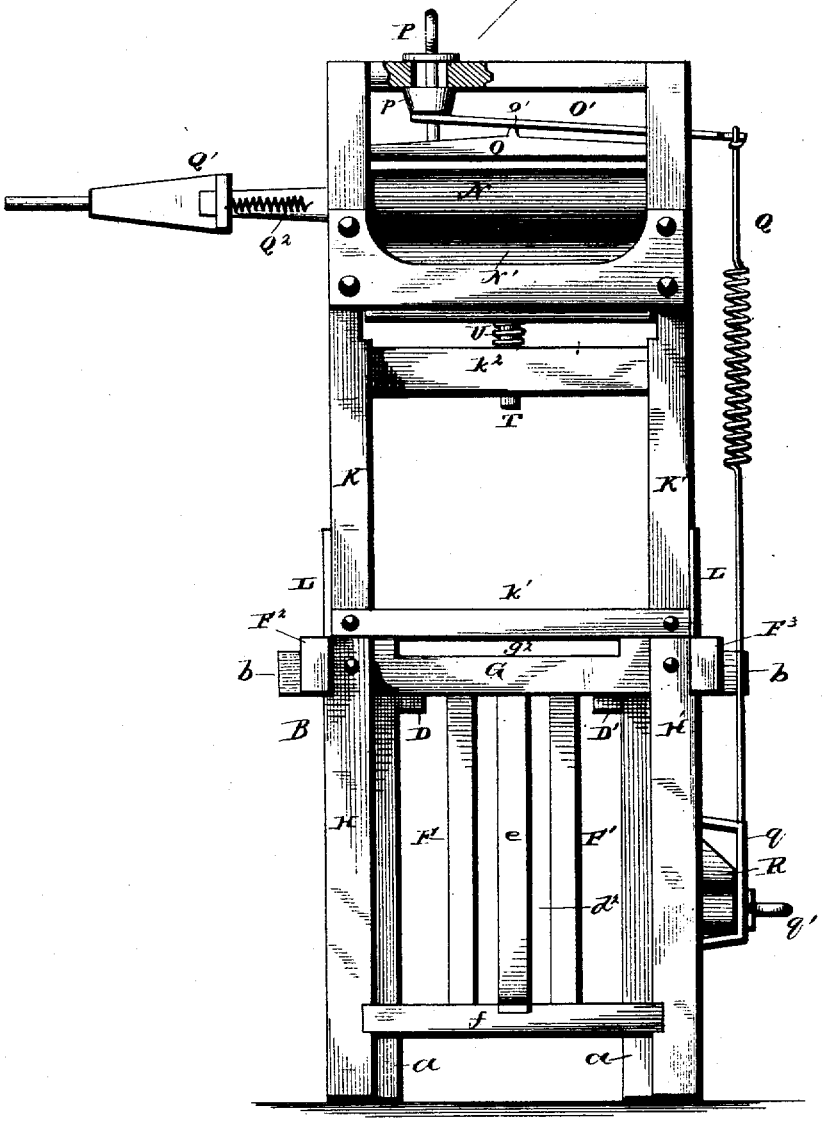

68. TEXTILES, FLUID TREATING APPARATUS.
236
BEST AVAILABLE COPY
6 Sheets—Sheet 1.
E. A. JONES.
BENCH CLOTHES WRINGER.
No. 10,148.
Reissued July 4, 1882.
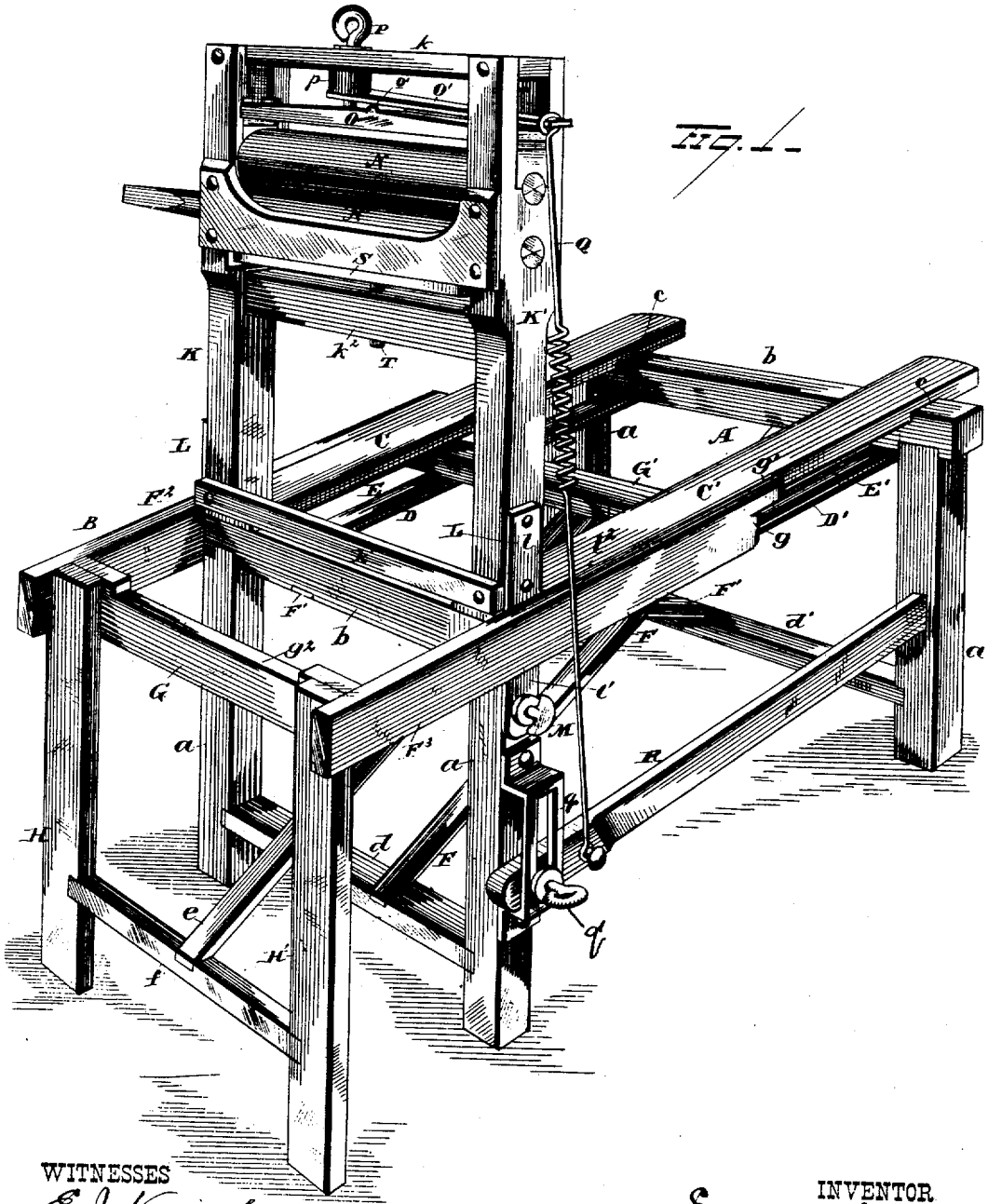
WITNESSES
E. L. Nottingham
Herman Moran
INVENTOR
Edgar A. Jones
B. P. & A. Symons
ATTORNEY
N. PETERS, Photo-Lithographer, Washington, D. C.

6 Sheets—Sheet 2.
E. A. JONES.
BENCH CLOTHES WRINGER.
No. 10,148. Reissued July 4, 1882.
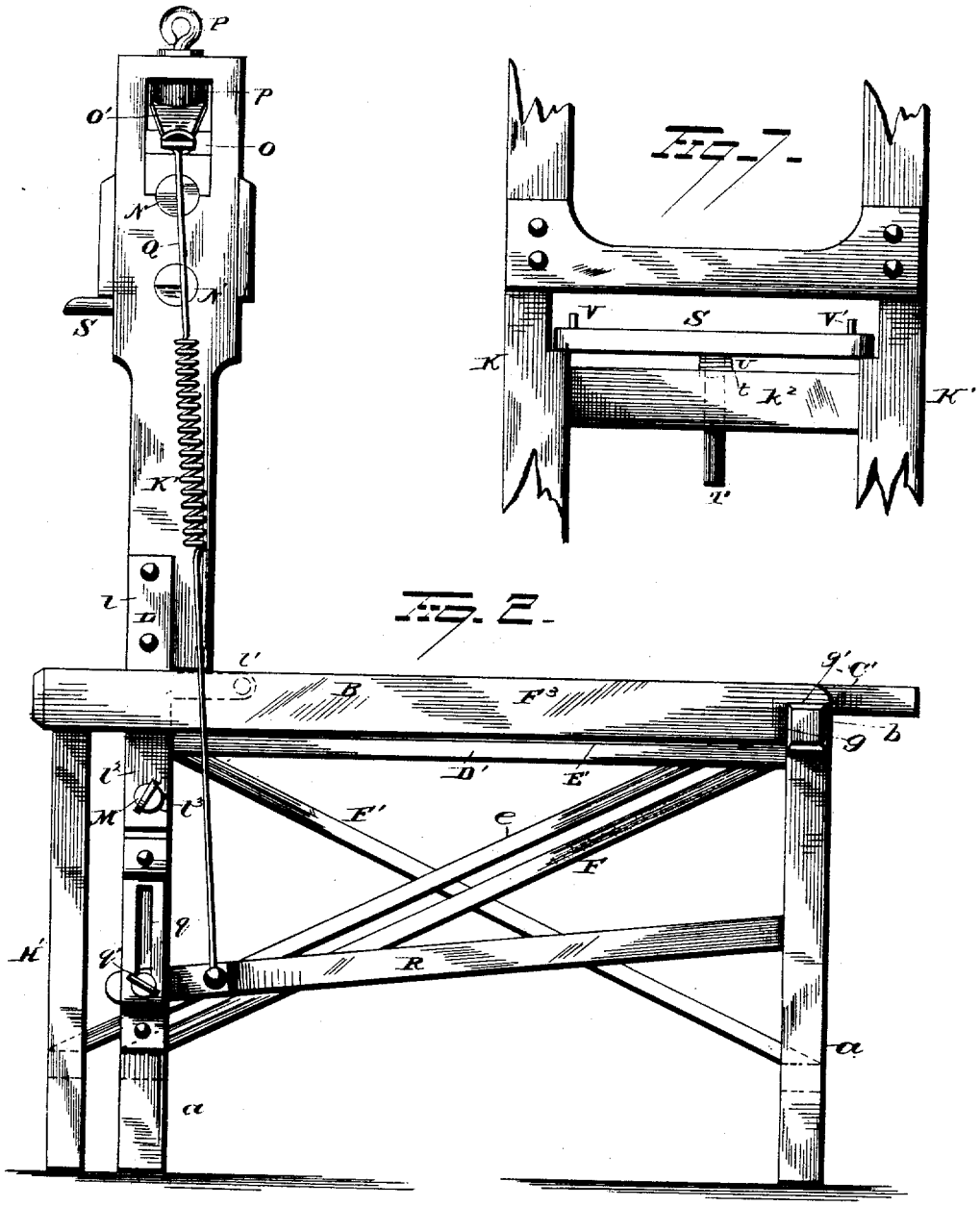
WITNESSES
E. G. Nottingham
Herman Moran.
INVENTOR
Edgar A. Jones.
By H. A. Seymour.
ATTORNEY
N. PETERS, Photo-Lithographer, Washington, D. C.

6 Sheets—Sheet 3.
E. A. JONES.
BENCH CLOTHES WRINGER.
No. 10,148. Reissued July 4, 1882.
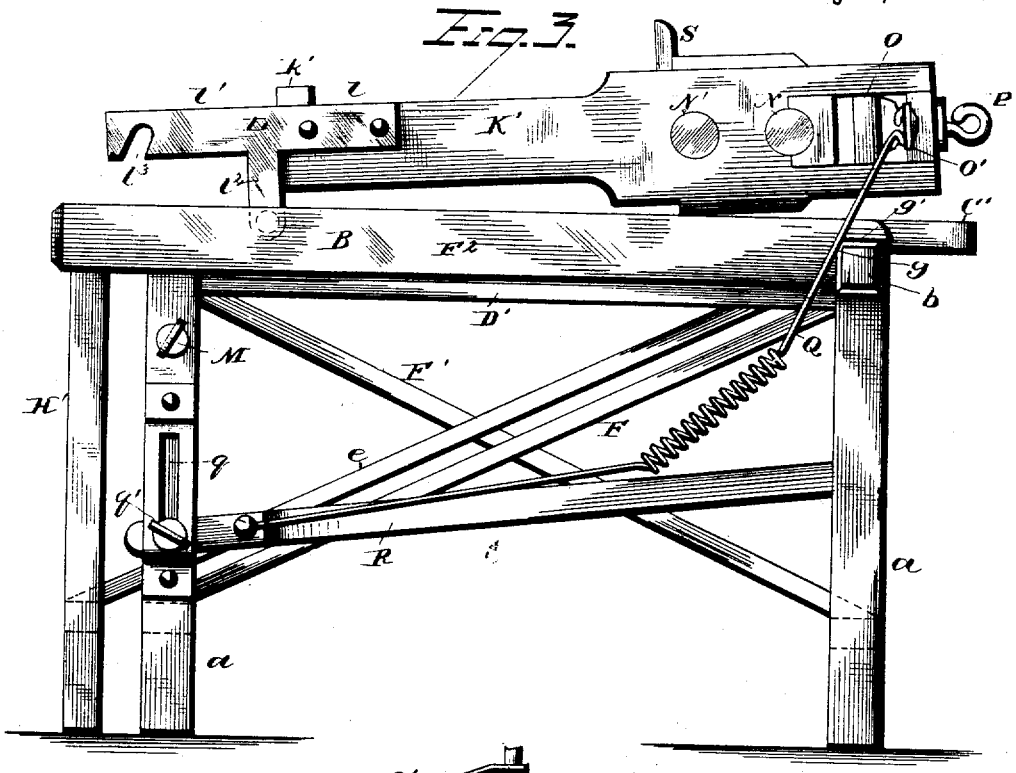
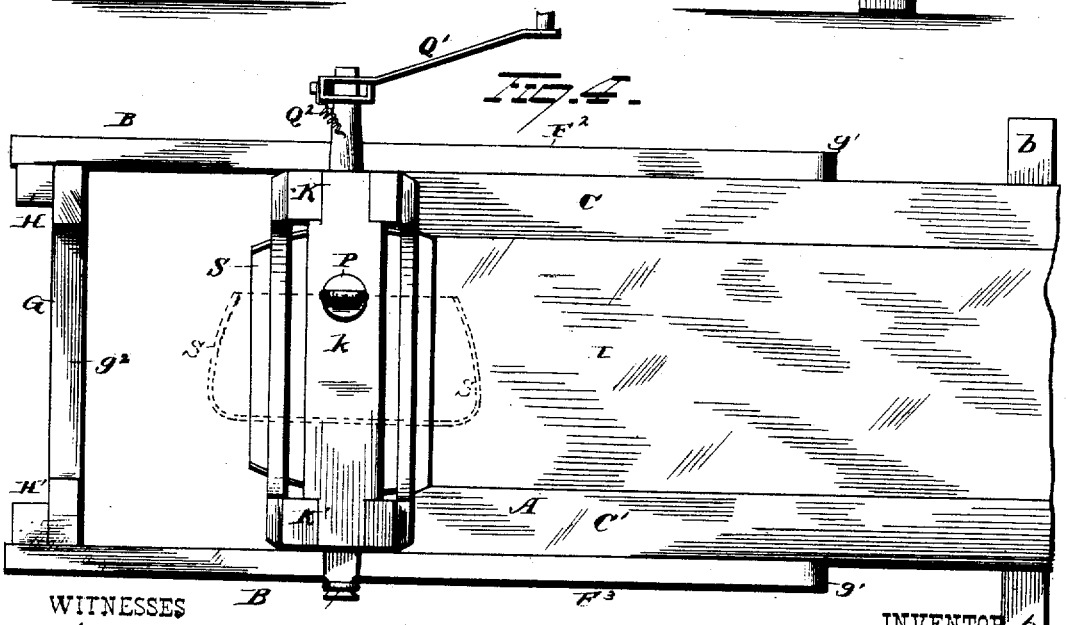
WITNESSES
E. A. Nottingham
Herman Moran.
INVENTOR
Edgar A. Jones.
By H. A. Seymour.
ATTORNEY
N. PETERS, Photo-Lithographer, Washington, D. C.

6 Sheets—Sheet 4.

E. A. JONES.

BENCH CLOTHES WRINGER.

No. 10,148. Reissued July 4, 1882.

WITNESSES
Herman Moran.
A. F. Bright.

INVENTOR
Edgar A. Jones.
By H. A. Seymour.
ATTORNEY

N. PETERS, Photo-Lithographer, Washington, D. C.

6 Sheets—Sheet 5.
E. A. JONES.
BENCH CLOTHES WRINGER.
No. 10,148. Reissued July 4, 1882.
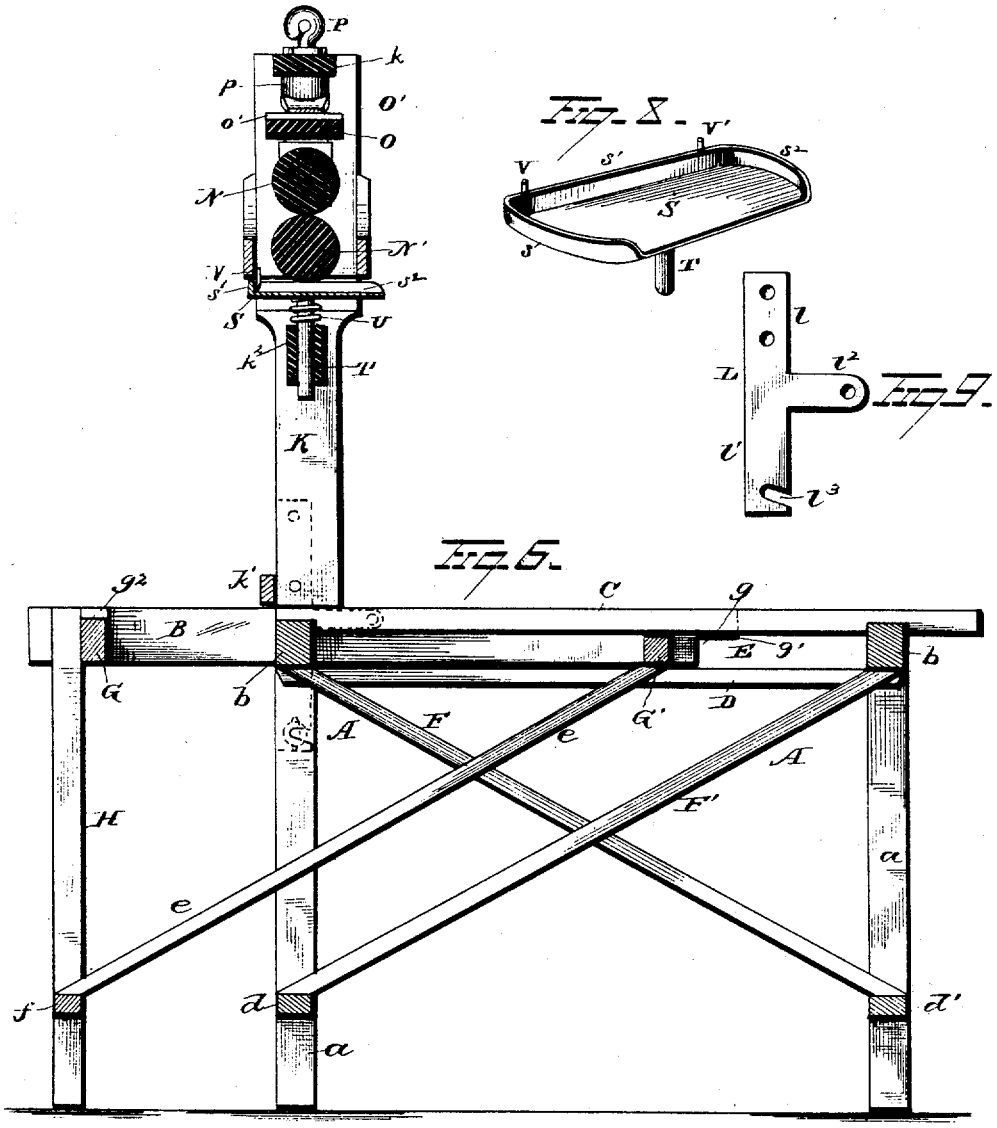
WITNESSES
E. L. Nottingham
Herman Moran.
INVENTOR
Edgar A. Jones.
By H. A. Symons.
ATTORNEY
N. PETERS, Photo-Lithographer, Washington, D. C.

6 Sheets--Sheet 6.
E. A. JONES.
BENCH CLOTHES WRINGER.
No. 10,148. Reissued July 4, 1882.
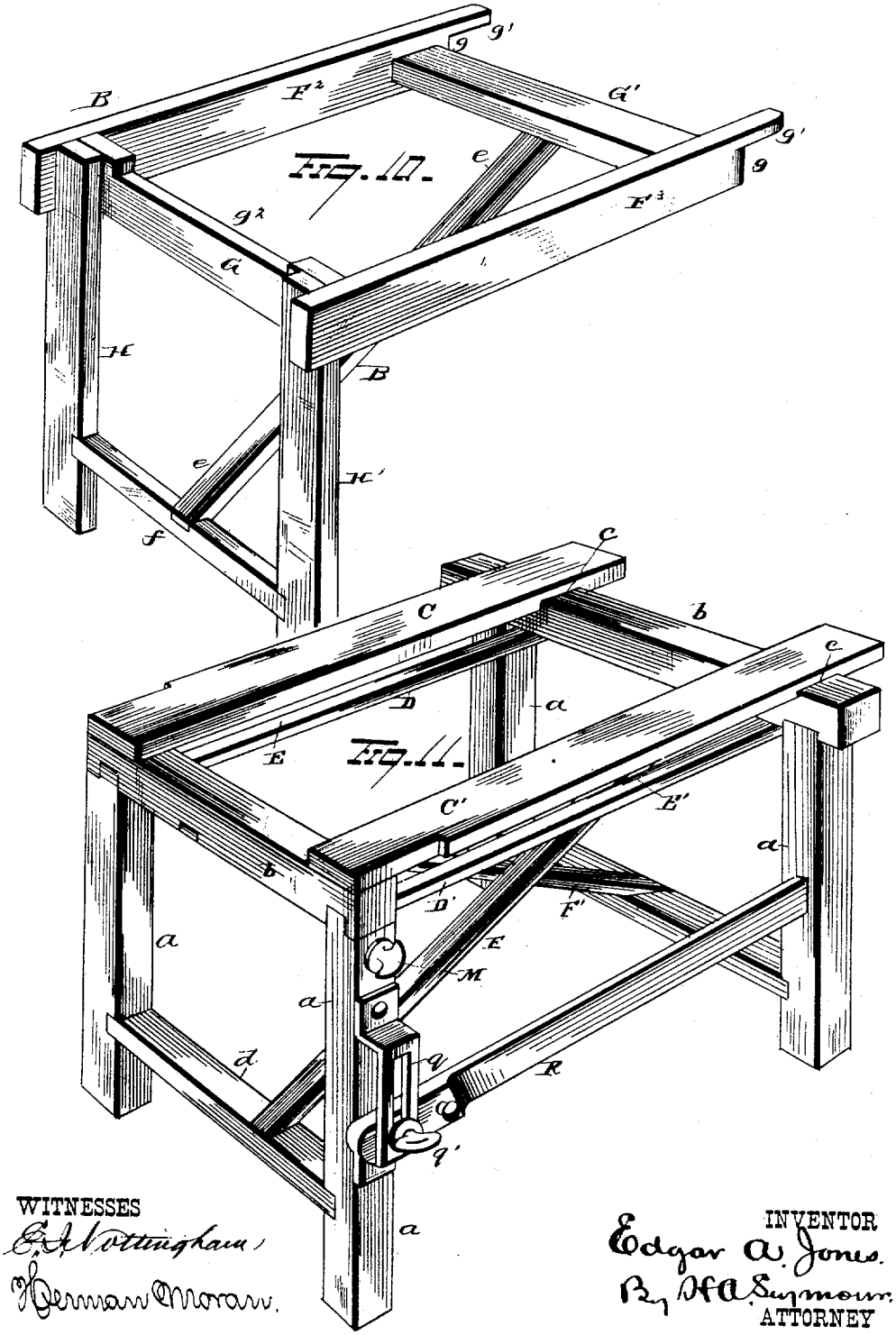
WITNESSES
E. A. Nottingham,
Herman Moran.
INVENTOR
Edgar A. Jones.
By H. A. Seymour.
ATTORNEY
N. PETERS, Photo-Lithographer, Washington, D. C.

68. TEXTILES, FLUID
TREATING APPARATUS.

Search Room

236

UNITED STATES PATENT OFFICE.

EDGAR A. JONES, OF STURGIS, MICHIGAN.

BENCH CLOTHES-WRINGER.

SPECIFICATION forming part of Reissued Letters Patent No. 10,148, dated July 4, 1882.

Original No. 240,728, dated April 26, 1881. Application for reissue filed November 28, 1881.

*To all whom it may concern:*

Be it known that I, EDGAR A. JONES, of Sturgis, in the county of St. Joseph and State of Michigan, have invented certain new and useful Improvements in Bench Clothes-Wringers; and I do hereby declare the following to be a full, clear, and exact description of the invention, such as will enable others skilled in the art to which it pertains to make and use it, reference being had to the accompanying drawings, which form part of this specification.

My invention relates to an improvement in bench clothes-wringers.

In the accompanying drawings, Figure 1 is a view in perspective of my improvement in bench clothes-wringers, the wringer being shown in position for operation and the extension-bench adjusted for use. Fig. 2 is a view in side elevation, showing the wringer in position for use and the extension-bench inserted within the wringer-table. Fig. 3 is a similar view, showing the wringer folded upon the wringer-table. Fig. 4 is a plan view of the machine. Fig. 5 is an end view. Fig. 6 is a view in vertical section taken through the rollers and water-pan. Fig. 7 is a detached view, in side elevation, of the water-pan, showing it in a depressed position for being rotated. Fig. 8 is a detached view, in perspective, of the water-pan. Fig. 9 is a detached view of the plate which serves as one of the hinges for the wringer-standard. Fig. 10 is a detached view, in perspective, of the extension-bench; and Fig. 11 is a similar view of the wringer-table.

The table is composed of the parts A and B. Part A consists of the legs *a*, each pair being connected by the end cross-pieces, *b*, and the latter connected by the top side bars, C C′, which are let into mortises *c* formed in the upper sides of the end cross-pieces, *b*, and by the lower side bars, D D′, which are attached at their opposite ends to the under side of the cross-pieces *b*, whereby longitudinal guideways E E′ are formed between the upper and lower bars.

F F′ are diagonal braces, their upper ends being secured to the end cross-pieces, *b*, while their lower ends are fastened to the cross-braces *d d′*. The diagonal braces are situated at such distance apart as to form the space $d^2$ between their adjacent edges.

B is the extensible portion of the table or bench, and is composed of the side pieces, $F^2$ $F^3$, which are arranged to fit against the sides of the bars C C′, said side pieces, $F^2$ $F^3$, being connected at their ends by the end cross-bars, G G′. The end cross-bar G′ is located between the upper and lower side bars, C C′ and D D′, of the table A, and serves as a supporting-guide for the extension bench or table, said cross-bar G′ being free to move to and fro in the guideways E E′. The outer end of the extension bench or table B is provided with the legs H H′, which support its outer end. A diagonal brace, *e*, is secured at one end to the central portion of the cross-bar G′ and at its opposite end to the cross-brace *f*. This brace *e* is arranged to be moved in and out of the space $d^2$ formed between the diagonal braces F F′. The ends of the side pieces, $F^2$ $F^3$, are formed with cut-away portions *g*, thereby allowing the projections *g′* to move over the end pieces, *b*, of table A, and be supported thereby when the extension-bench is not in use. These two tables A B have the same height, and are intended to support the wash-tub containing the clothes and a second tub or clothes-basket, into which the clothes are to be placed as rapidly as they are wrung out. Upon the top of either one of these tables can be placed the board I, which extends along the center of the table, and may be used upon the table for the purpose of making its whole surface solid, so as to adapt it for ironing or any other use.

The board I is adapted to be removably secured between the side bars C C′ of the table A. This board I may also be applied to the extensible bench or table B, and thus form a support for a tub or basket to rest upon. The end cross-piece G is recessed, as at $g^2$, for the reception and retention of the board. This board can also be used as an additional extension, in connection with either the table or extension, by having the board supported at one end upon the extension bench or table and at the other end upon a chair or any other suitable support.

The wringer-frame consists of the standards K K′, connected at their upper and lower ends by the cross-pieces *k k′* and the central cross-piece, $k^2$. The standards are pivoted to the table A by means of the T-shaped plates or couplings L, consisting of the long arms $l$ $l'$ and the short arm $l^2$. The upper arm, $l$, is screwed to the front portion of the lower ends of the standards K K′, while the outer ends of the short arms $l^2$ are pivoted to the side bars C C′. By this construction of parts the wringer-frame may be folded down upon the top of the table A.

The lower arms, $l'$, of the plates L are provided with open slots $l^3$, within which engage the set-screws or bolts and thumb-nuts M when the wringer-frame is raised to its vertical position, and then by tightening the set screws or bolts and thumb-nuts the wringer-frame is firmly secured in position for use. By simply loosening the set-screws the wringer-frame may be folded upon the table A, as illustrated in Fig. 3. While the wringer is folded down so as to be out of the way and the extensible bench inserted within the table A, the machine is rendered compact and requires but little room for storage.

N N′ are the wringer-rollers, the upper roller being mounted in vertically-movable journal-boxes, upon which latter are supported the opposite ends of the cross-bar O, which is provided with a central projection, $o'$, that serves as a bearing for the flat spring or lever O′. A set-screw is inserted through the top cross-bar, $k$, and into the cross-bar O, said set-screw being provided with a collar, $p$, which bears upon the short arm of the lever O′. This set-screw is inserted in an elongated opening or slot, as shown in Fig. 5, whereby the collar $p$ may be moved toward or away from the bearing $o'$, and thus increase or decrease the effective length of the short arm of the lever O′.

To the long arm of the lever O′ is attached the spring connecting-rod Q, the lower end of which is fastened to a lever, R, the latter being pivoted at one end to one of the legs $a$ of the table, while its free end is located between the slotted guide $q$ and the leg $a$ at the opposite end of the table. Passing through this slotted guide $q$ is a set-screw, $q'$, which engages with the free end of the lever R. By pressing down the free end of the lever R any desired tension can be transmitted to the rollers and maintained by securing the lever by the set-screw. The handle Q′, attached to the operating-roller, is retained against displacement by means of the spiral spring $Q^2$.

Beneath the lower roller, N′, is located the water pan or trough S, which has flanges extending either all around its edges or only the three flanges—viz., the end flanges, $s$ $s^2$, and side flanges, $s'$. When the pan has a flange extending around only three of its edges it is provided with a pivotal shaft, T, the upper end of which is secured to the under side of the pan, while the lower end passes down through a suitable support or cross-bar, $k^2$, the latter being recessed, as at $t$, for the reception of the lower end of the spiral spring U, which encircles the pivot T, the upper end of the spring engaging the under side of the pan. Each end of the pan is then made rounding, so that the pan can be turned upon its pivot, and thus turn its open edge toward either side of the rollers, according as it is desired to have the water that is pressed from the clothes run down upon one side or the other. The pan is prevented from accidental displacement by the pins V V′. The pan is retained in its position by the pressure of the spiral spring. When it is desired to reverse the position of the pan the latter is depressed and then rotated on its pivot.

Having fully described my invention, what I claim as new, and desire to secure by Letters Patent, is—

1. The combination, with the wringer-frame and wringer-rollers journaled therein, of a water-pan located below the wringer-rollers and between the side pieces of the wringer-frame, and supported on a vertical shaft journaled in the cross-bar of the wringer-frame, and a spring encircling the vertical shaft or pivot and serving to retain the pan in the desired adjustment, substantially as and for the purpose set forth.

2. The combination, with the wringer-frame and wringer-rollers supported therein, of a rotary adjustable water-pan located beneath the rollers and supported on a vertical pivot, a spring for forcing the pan upwardly, and pins on the upper edge of the pan to retain it against accidental displacement, substantially as set forth.

3. The combination, with the wringer-frame and rollers supported therein, of a rotary adjustable water-pan provided with a vertical pivot or support, a cross-bar of the wringer-frame, constructed with an opening to receive the pivot of the water-pan and provided with a recess, and a spiral spring encircling the vertical pivot and seated in the recess of the cross-bar, substantially as set forth.

4. The combination, with the table and wringer-frame, of a plate secured to the wringer-frame and pivoted to the table, said plate having an open slot adapted to receive a set-screw attached to the leg of the table and be firmly secured thereby, substantially as set forth.

5. The combination, with the adjustable cross-bar located over the rollers, a lever bearing on said cross-bar, and a spring connecting-rod attached to the lever, of a lever pivoted to one of the table-legs, a slotted guide attached to another table-leg and adapted to receive the free end of the lever, the lower end of the spring connecting-rod being secured to the free end of said lever, and a set-screw attached to the lever and inserted through an elongated slot in the guide, substantially as and for the purpose set forth.

In testimony whereof I have signed this specification in the presence of two subscribing witnesses.

EDGAR A. JONES.

Witnesses:
N. SNYDER,
ALBERT C. TITUS.